Feb. 26, 1957  J. B. BRENNAN  2,783,086
APPARATUS FOR SPRAYING MOLTEN MATERIALS
Filed Aug. 4, 1953
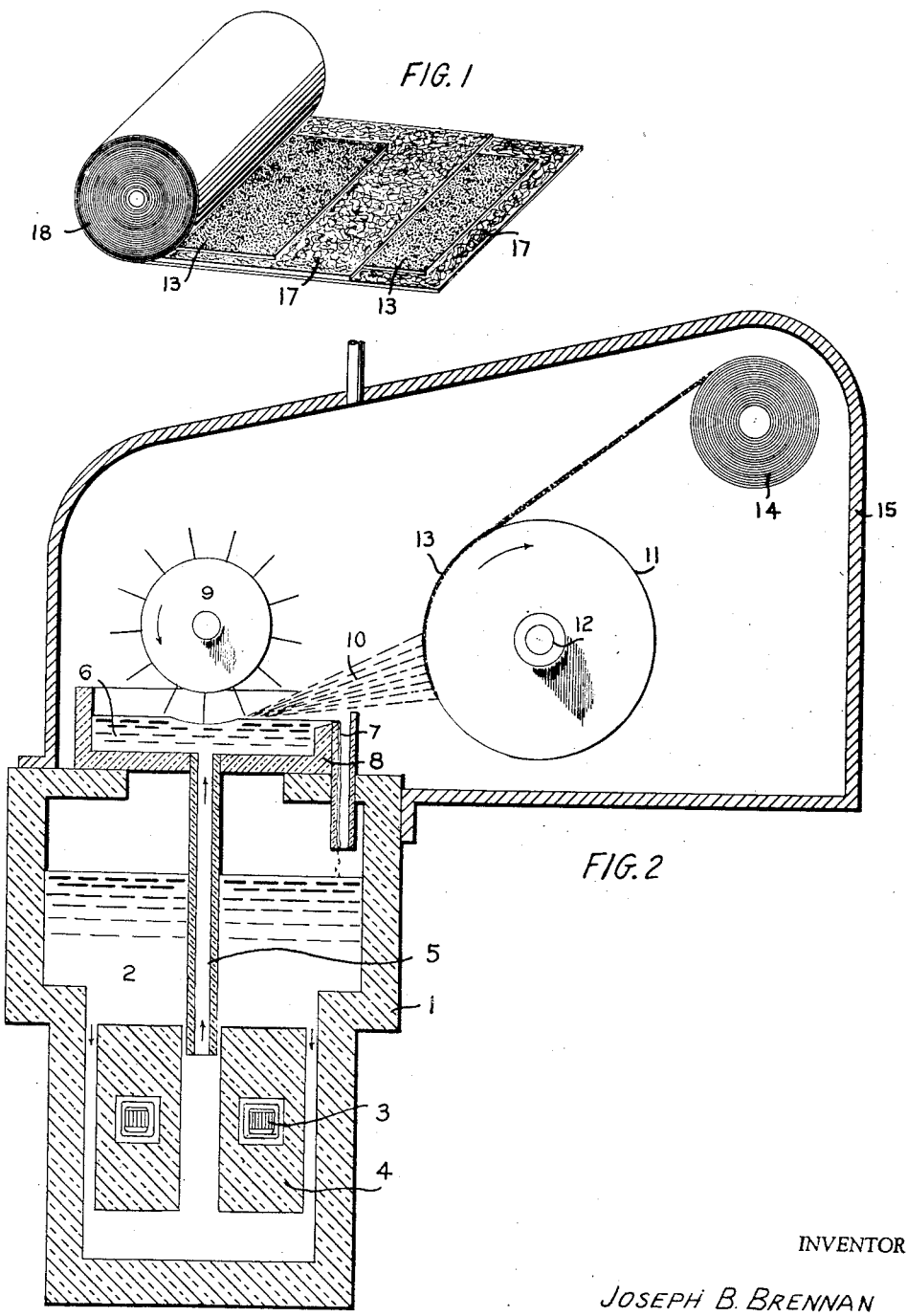
INVENTOR
JOSEPH B. BRENNAN
BY
ATTORNEYS United States Patent Office 2,783,086
Patented Feb. 26, 1957

2,783,086

APPARATUS FOR SPRAYING MOLTEN MATERIALS

Joseph B. Brennan, Cleveland, Ohio

Application August 4, 1953, Serial No. 372,266

10 Claims. (Cl. 299—28.6)

This invention relates to the spraying of molten materials which are normally solid, and apparatus therefor.

An object of this invention is to maintain a constant head in a body of molten material so that the molten material may be removed therefrom at a constant rate and atomized at a constant rate so as to produce constant particle size continuously and also to produce constant density, porosity and gauge strip material continuously.

This application relates to the invention covered in my co-pending U. S. application Serial No. 40,610 filed July 24, 1948, issued on August 11, 1953 as Patent No. 2,648,119.

In the accompanying drawings:

Figure 1 is a perspective view of a condenser roll made from electrodes embodying the principles of the invention, and Figure 2 is a vertical section, partially shown in diagrammatic form, of apparatus for processing the method of the invention and for producing an electrode of the invention.

The drawings show a crucible 1, which may be made from aluminum oxide, and which contains a quantity of molten aluminum 2 which is heated to a desired temperature by means such as induction coils 3 which are immersed in the aluminum 2. These induction coils are shown as being enclosed by a shell 4 that may be made from aluminum oxide. The induction coils 3 maintain the aluminum 2 at a temperature such as about 1450 deg. F. and cause such metal to circulate down around the shell 4 and up through a tube 5 which extends down into the aluminum 2, with the circulation being indicated by arrows shown on Figure 2. This tube or duct 5 extends to and is carried by an overflow crucible 8 so that when molten aluminum has obtained a level equal to the height of an overflow tube 7 associated with the crucible 8 such excess molten aluminum will flow back into the crucible 1 by means of the tube 7.

As stated above the induction coil 3 maintains the aluminum 2 at about 1450° F. and creates a magnetic field which causes an upsurge of the aluminum in the tube 5. This is due to the magnetic field which is created by the induction coils. The circulation in this type of induction heater is well known and is indicated by an arrow in Fig. 2. Normally the circulation would not exist except within the pot of metal 1, inasmuch as the tube 5 is fitted within the ceramic enclosure for the induction coils 3 in a vertical position and has the crucible, or top chamber, 8 fitted with an overflow when the aluminum surges up through the tube 5 due to the molecular agitation created by the magnetic field. The surplus of metal, which flows through the tube 5 into the top chamber 8, overflows down through the overflow 7. This overflow is always big enough to accommodate any of the surplus created by the field strength of the magnetic coils 3.

Ordinarily the aluminum flowing up through the tube 5 does not flow at a constant rate but has intermittent pulsations. It is for this reason that the top chamber 8 is entirely necessary and desirable to create a constant level and for this reason the overflow 7, which re-circulates any surplus metal flowing into the chamber 8, is necessary to create and maintain a constant head. This constant head is necessary in order to have a constant rate of atomization and in order to attain and maintain a constant particle size.

In order to deposit aluminum particles from the overflow crucible 8, a rotating brush 9 is shown positioned in immediately adjacent relationship to the upper surface of the fluid aluminum carried by the crucible 8. This brush 9, has a plurality of metallic or ceramic fingers 9a, or wires extending therefrom, and these wires are adapted to extend slightly into the aluminum carried by the overflow crucible so as to pick up aluminum from the constant level of molten aluminum retained in the crucible and force, sling or throw such aluminum toward a temperature controlled rotated roll 11. Particles of molten aluminum are indicated in the particle stream 10, being thrown towards the rotated roll 11, for deposit thereon. This roll 11, normally must be cooled by suitable fluid in contact therewith and usually flowing therethrough. An inlet 12, is indicated for cooling fluid for the roll 11. As particles reach the roll 11, the individual particles are deposited in overlapping relationship and their temperatures are such that the overlapped particles will coalesce with each other and due to the rapid cooling action effected thereon by the roll 11, the particles will retain a very porous condition, after solidification of the molten particles occur. Thus a porous strip 13, having inter-communicating cells therein is produced on the roll 11, and it may be continuously pulled therefrom and coiled up to form coil 14, as shown.

Preferably the deposit action of the molten aluminum particles 10, occurs under controlled pressure conditions so that a chamber 15 is provided enclosing the metal depositing means of the invention. The vacuum chamber 15 is used in order to prevent oxidation of the metal as it is sprayed. A tube 16 is shown connecting to the chamber 15, and it connects to a suitable source (not shown) of vacuum by which a desired degree of vacuum may be set up within the chamber 15. The roll 11, may comprise a moving band of anodised aluminum or stainless steel the temperature of which is controlled by the coolant moving in association therewith. Additional metal may be introduced into the crucible 1 in any desired manner. The constant level of molten metal retained in the crucible 8, is indicated by the numeral 6.

Figure 1 of the drawings shows that two porous metallic strips 13, produced in accordance with the invention, may be superimposed with conventional fibrous spacer strips 17 therebetween with such assembly then being formed into a condenser roll 18. Any suitable terminal means may be associated with this condenser 18.

What I claim is:

1. Spray apparatus for spraying normally solid molten material comprising an inductive heating and circulating system forming a molten metal pool having a constant head, spray means, said pool supplying said spray means from its surface at constant rate.

2. Apparatus for atomizing normally solid molten material comprising an inductive circulating means surrounding at least a part of a pool of molten metal, means whereby the pool is maintained at a constant head and means whereby an atomized stream is fed from the surface of the pool at a constant rate.

3. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, overflow means for maintaining molten metal in said vessel at a constant level, and means for spraying metal from the surface of the pool of molten metal.

4. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, overflow means for maintaining molten metal in said vessel at a constant level and including a tube for returning metal overflowing from said vessel to said receptacle, and means for spraying metal from the surface of the pool.

5. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, overflow means for maintaining molten metal in said vessel at a constant level, means for returning molten metal overflowing from said vessel to said receptacle to maintain a circulation of molten metal from the receptacle to the vessel and back to the receptacle to maintain the temperature of the metal in the vessel substantially constant, and means for spraying metal from the surface of the pool.

6. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, means for feeding metal from said vessel to a spraying device, and overflow means for maintaining molten metal in said vessel at a constant level.

7. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, means for discharging particles of molten metal from the surface of the metal in said vessel in the form of a spray, and overflow means for maintaining molten metal in said vessel at a constant level.

8. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, means for feeding metal from said vessel to a spraying device, overflow means for maintaining molten metal in said vessel at a constant level, and means for returning molten metal overflowing from said vessel to said receptacle to maintain a circulation of molten metal from the receptacle to the vessel and back to the receptacle to maintain the temperature of the metal in the vessel substantially constant.

9. Apparatus for heating and maintaining a pool of molten metal at a constant head comprising a receptacle for a body of metal, induction heating coil means in said receptacle for surrounding a leg of metal in said receptacle and producing an upward flow of said leg of metal, a conduit extending upwardly from said heating coil means for conducting metal upwardly from said leg, a vessel positioned at a level above said receptacle for receiving metal from the conduit and of considerably larger cross-sectional area than that of the conduit, means for discharging particles of molten metal from the surface of the metal in said vessel in the form of a spray, overflow means for maintaining molten metal in said vessel at a constant level, and means for returning molten metal overflowing from said vessel to said receptacle to maintain a circulation of molten metal from the receptacle to the vessel and back to the receptacle to maintain the temperature of the metal in the vessel substantially constant.

10. An apparatus for heating and maintaining a pool of molten metal at a constant head comprising a crucible for a body of metal, induction heating coil means in said crucible for surrounding said metal and for producing an upward flow of molten metal, a container for the molten metal located above the crucible and connected to the crucible through a conduit, means whereby the pool of molten metal is maintained at a constant head, and means for spraying metal from the surface of the pool.

References Cited in the file of this patent

UNITED STATES PATENTS

| | | |
|---|---|---|
| 2,188,721 | McWhorter et al. | Jan. 30, 1940 |
| 2,536,325 | Tama | Jan. 2, 1951 |
| 2,536,859 | Tama | Jan. 2, 1951 |
| 2,539,215 | Weil et al. | Jan. 23, 1951 |
| 2,539,800 | Tama | Jan. 30, 1951 |
| 2,583,668 | Robson | Jan. 29, 1952 |